United States Patent
Nair et al.

(10) Patent No.: US 11,636,020 B2
(45) Date of Patent: Apr. 25, 2023

(54) ELECTRONIC DEVICE AND ON-DEVICE METHOD FOR ENHANCING USER EXPERIENCE IN ELECTRONIC DEVICE

(71) Applicant: SAMSUNG ELECTRONICS CO., LTD., Gyeonggi-do (KR)

(72) Inventors: Renju Chirakarotu Nair, Bangalore (IN); Hiren Bharatbhai Gajjar, Bangalore (IN); Syama Sudheesh, Bangalore (IN); vaisakh Punnekkattu Chirayil Sudheesh Babu, Bangalore (IN); Rajib Basu, Bangalore (IN); Raju Suresh Dixit, Bangalore (IN)

(73) Assignee: Samsung Electronics Co., Ltd

( * ) Notice: Subject to any disclaimer, the term of this patent is extended or adjusted under 35 U.S.C. 154(b) by 21 days.

(21) Appl. No.: 16/978,110

(22) PCT Filed: Mar. 8, 2019

(86) PCT No.: PCT/KR2019/002749
§ 371 (c)(1),
(2) Date: Sep. 3, 2020

(87) PCT Pub. No.: WO2019/172718
PCT Pub. Date: Sep. 12, 2019

(65) Prior Publication Data
US 2021/0011829 A1 Jan. 14, 2021

(30) Foreign Application Priority Data

Mar. 9, 2018 (IN) .............................. 201841008695
Dec. 7, 2018 (IN) .............................. 201841008695

(51) Int. Cl.
*G06F 11/34* (2006.01)
*G06F 3/04817* (2022.01)
(Continued)

(52) U.S. Cl.
CPC ...... *G06F 11/3438* (2013.01); *G06F 3/04817* (2013.01); *G06F 11/3055* (2013.01); *G06F 11/3447* (2013.01); *G06K 9/6257* (2013.01)

(58) Field of Classification Search
CPC ............ G06F 11/3438; G06F 3/04817; G06F 11/3055
See application file for complete search history.

(56) References Cited

U.S. PATENT DOCUMENTS

2004/0010491 A1* 1/2004 Riedinger ......... G06F 16/24564
2004/0205040 A1* 10/2004 Yoshioka ................ G06N 5/02
706/50

(Continued)

FOREIGN PATENT DOCUMENTS

CN 105867675 8/2016
CN 106339089 1/2017
(Continued)

OTHER PUBLICATIONS

PCT/ISA/210 Search Report issued on PCT/KR2019/002749, dated Jun. 19, 2019, pp. 3.
(Continued)

*Primary Examiner* — David E Choi
(74) *Attorney, Agent, or Firm* — The Farrell Law Firm, P.C.

(57) ABSTRACT

Embodiments herein provide an on-device method for enhancing user experience in an electronic device. The method includes monitoring a plurality of parameters associated with an operation of the electronic device. The method includes identifying an anomaly associated with the electronic device based on the plurality of parameters associated with the operation of the electronic device and identifying a class of anomaly to which the anomaly associated with the electronic device belongs using a first on-device model. Further, the method includes presenting at (Continued)

least one question associated with the identified class of anomaly to user of the electronic device using on a second on-device model and receiving at least one user input for the at least one question. Furthermore, the method includes performing at least one action for enhancing the user experience based on the at least one user input for the at least one question.

15 Claims, 11 Drawing Sheets

(51) Int. Cl.
  *G06F 11/30* (2006.01)
  *G06K 9/62* (2022.01)

(56) References Cited

U.S. PATENT DOCUMENTS

| | | |
|---|---|---|
| 2010/0082516 A1 | 4/2010 | Basu et al. |
| 2011/0029817 A1 | 2/2011 | Nakagawa et al. |
| 2012/0078062 A1* | 3/2012 | Bagchi .................... A61B 5/00 600/300 |
| 2013/0060524 A1 | 3/2013 | Liao |
| 2013/0197967 A1* | 8/2013 | Pinto .................. G06Q 10/0637 705/7.36 |
| 2013/0303159 A1 | 11/2013 | Gathala et al. |
| 2014/0179270 A1 | 6/2014 | Anand |
| 2014/0317734 A1 | 10/2014 | Valencia et al. |
| 2016/0117500 A1 | 4/2016 | Li et al. |
| 2016/0217022 A1 | 7/2016 | Velpasaoglu et al. |
| 2017/0076208 A1 | 3/2017 | Huang et al. |
| 2017/0245217 A1 | 8/2017 | Kim et al. |
| 2018/0024875 A1 | 1/2018 | Della Corte et al. |
| 2018/0025071 A1 | 1/2018 | Ideses et al. |
| 2018/0032890 A1* | 2/2018 | Podgorny ............ G06Q 30/016 |
| 2018/0107559 A1* | 4/2018 | Machida .............. G06F 11/3409 |
| 2018/0239837 A1* | 8/2018 | Wang ..................... G06F 16/17 |
| 2019/0058341 A1 | 2/2019 | Gou et al. |
| 2019/0227895 A1* | 7/2019 | Noguchi ............. G06F 11/3003 |
| 2019/0324766 A1* | 10/2019 | Parthasarathy ..... G06F 11/3006 |
| 2020/0042827 A1* | 2/2020 | Hamilton, II ......... G06F 40/253 |
| 2021/0011829 A1* | 1/2021 | Nair ..................... G06K 9/6257 |

FOREIGN PATENT DOCUMENTS

| | | |
|---|---|---|
| CN | 104182365 | 6/2017 |
| EP | 3 123 732 | 2/2017 |
| KR | 1020160059454 | 5/2016 |
| KR | 1020170097941 | 8/2017 |
| WO | WO 2015/143547 | 10/2015 |
| WO | WO 2017166036 | 10/2017 |

OTHER PUBLICATIONS

PCT/ISA/237 Written Opinion issued on PCT/KR2019/002749, dated Jun. 19, 2019, pp. 5.

Oecd Statistics Directorate: "OECD Glossary of Statistical Terms—Electronic Questionnaire Definition", XP055780073, Jun. 11, 2013, 1 page.

European Search Report dated Mar. 15, 2021 issued in counterpart application No. 19764052.7-1224, 11 pages.

Indian Examination Report dated Jul. 15, 2020 issued in counterpart application No. 201841008695, 7 pages.

\* cited by examiner

[Fig. 2A]
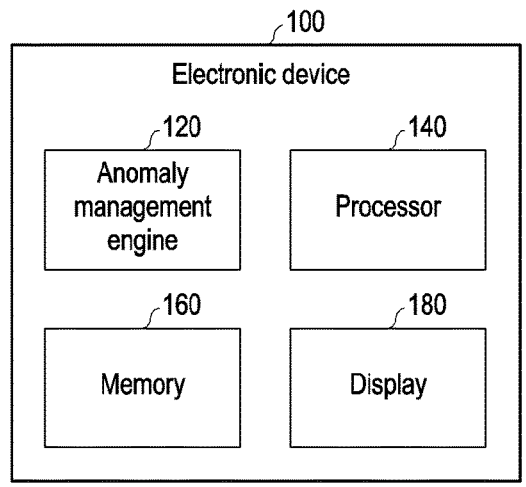
[Fig. 2B]
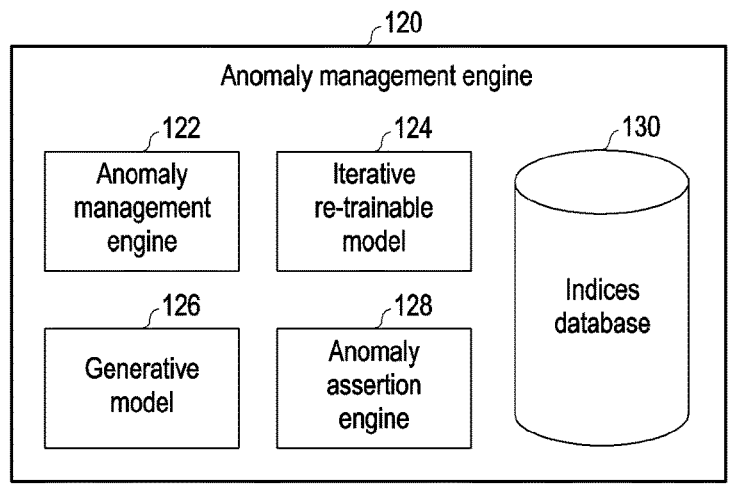
[Fig. 3]
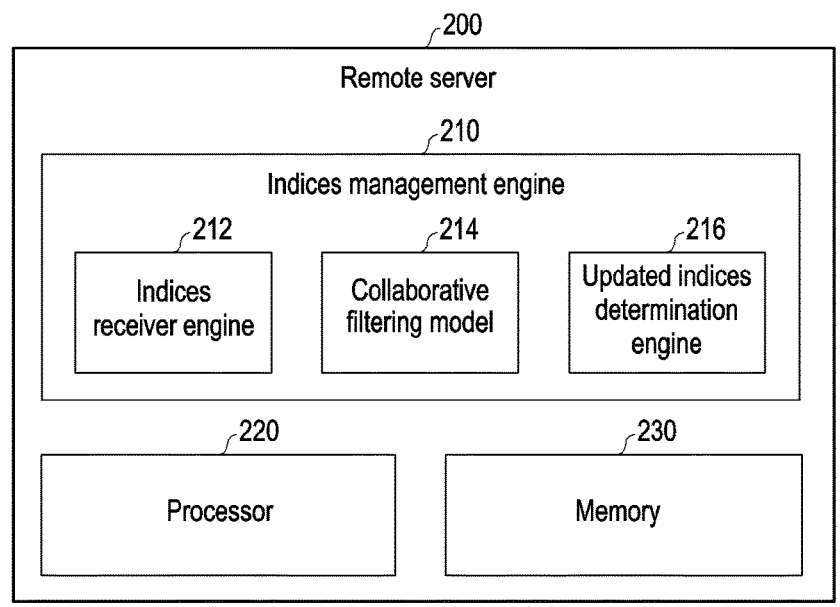

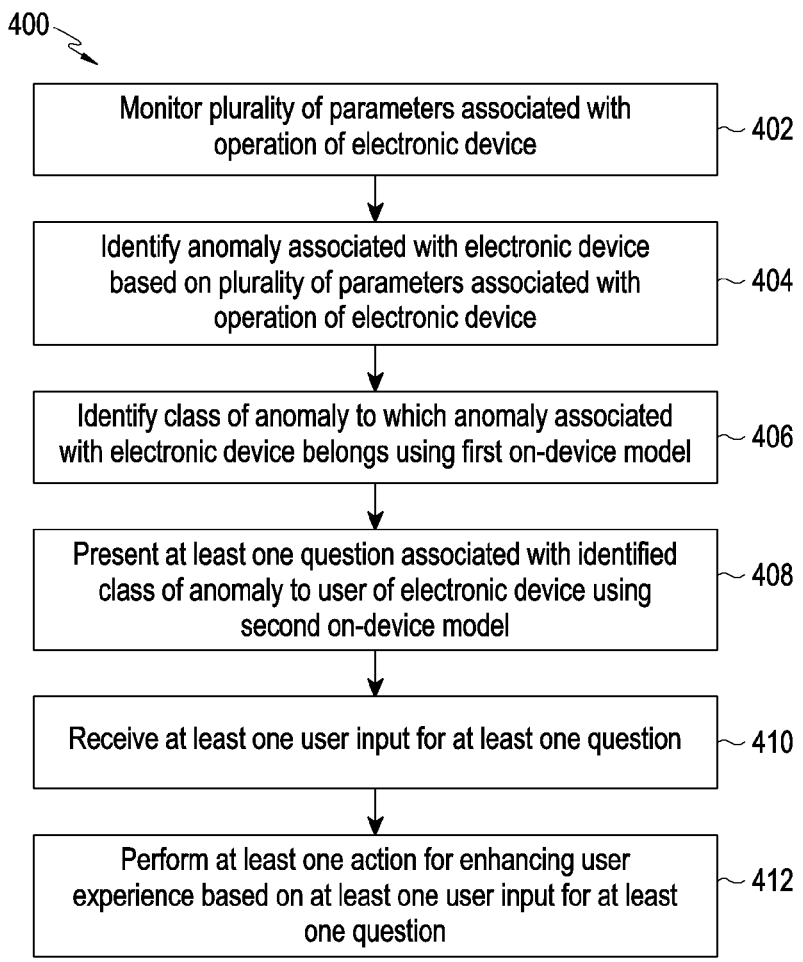

[Fig. 6A]
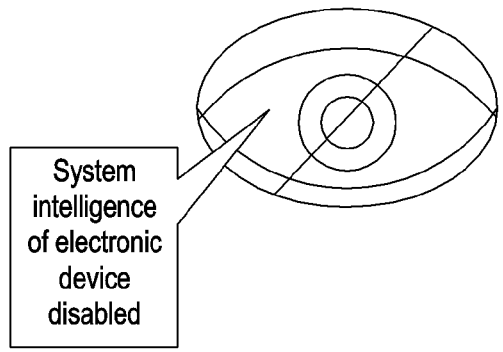
[Fig. 6B]
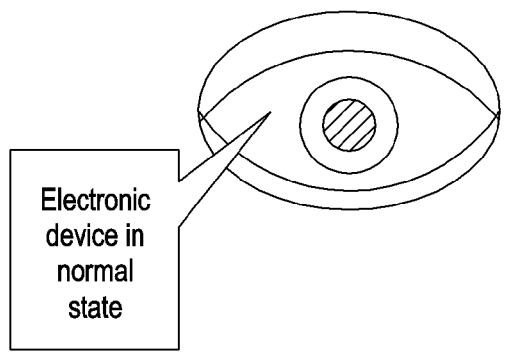
[Fig. 6C]
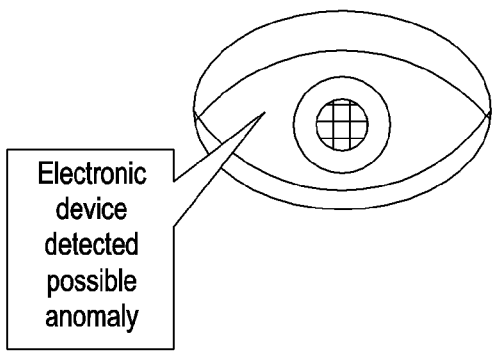
[Fig. 6D]
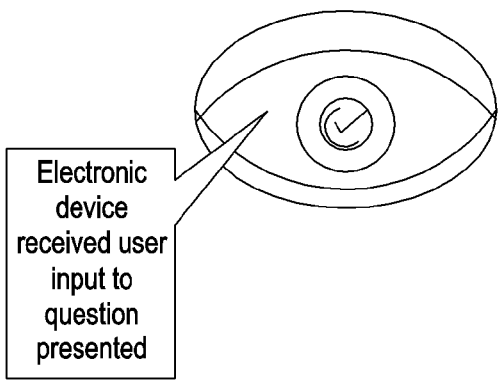

[Fig. 7]
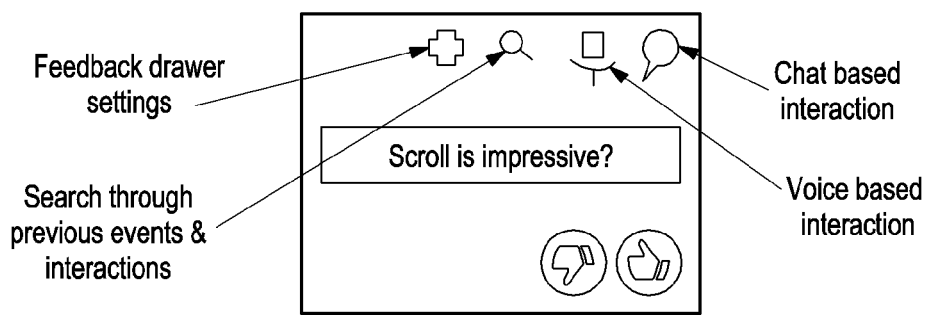
[Fig. 8]
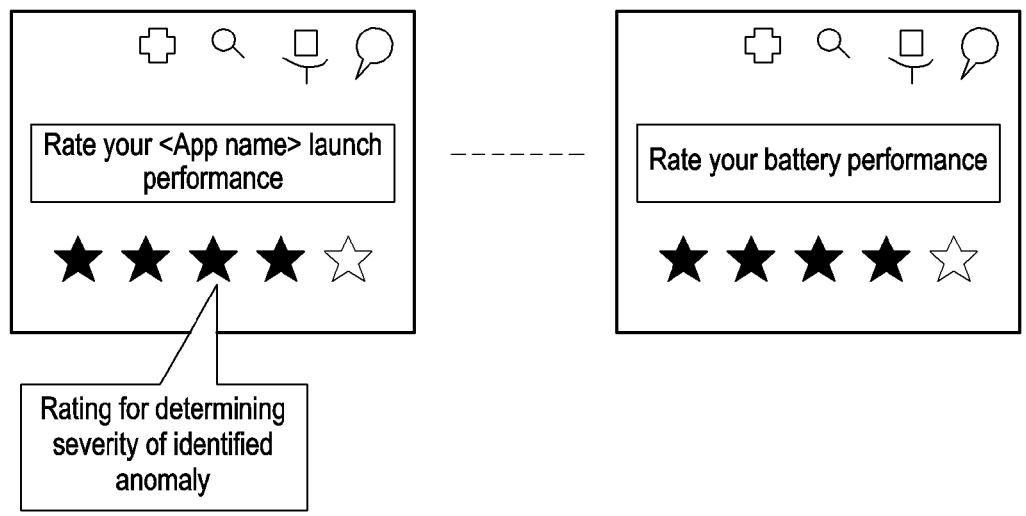

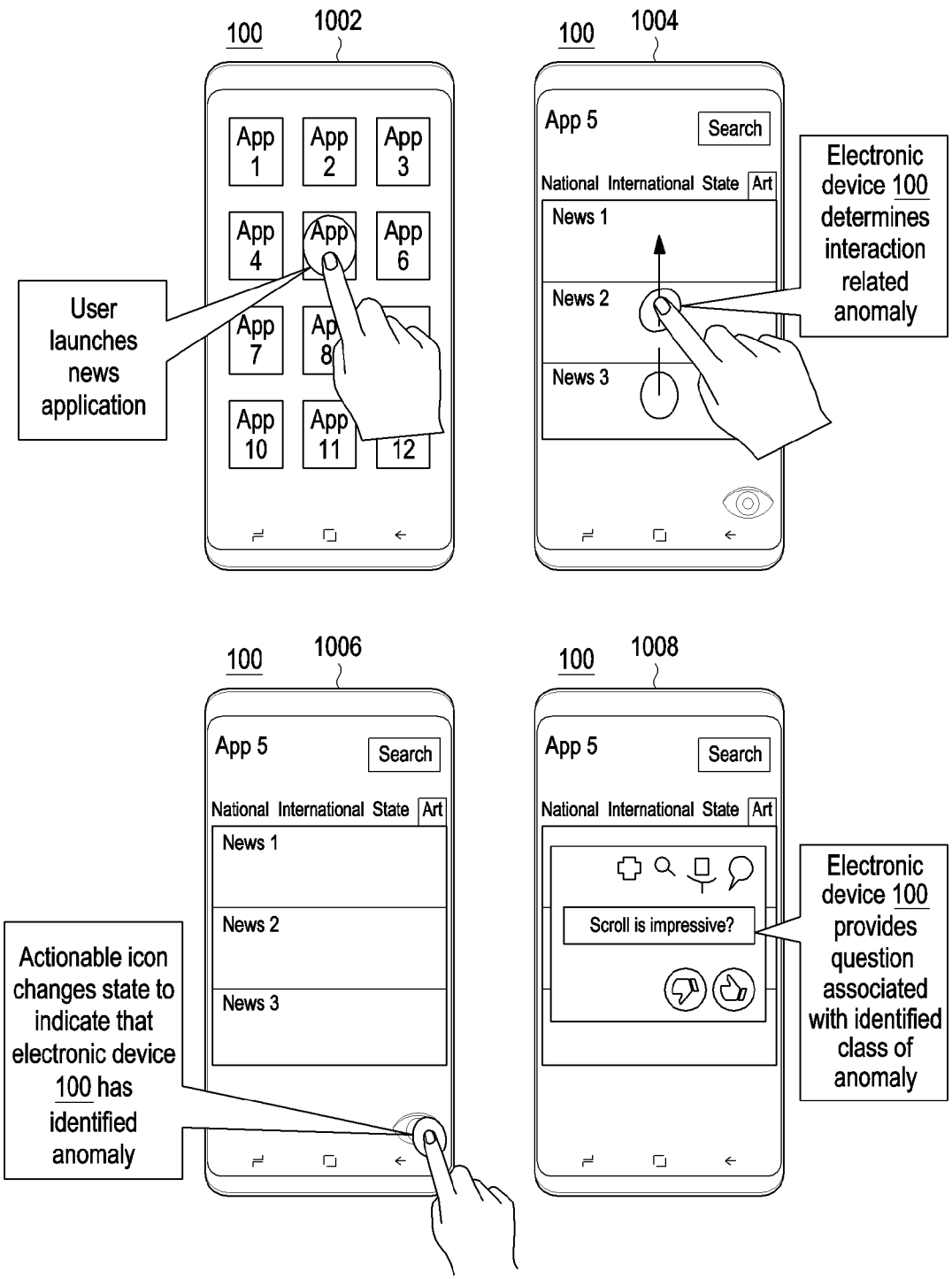
[Fig. 9]

[Fig. 10]
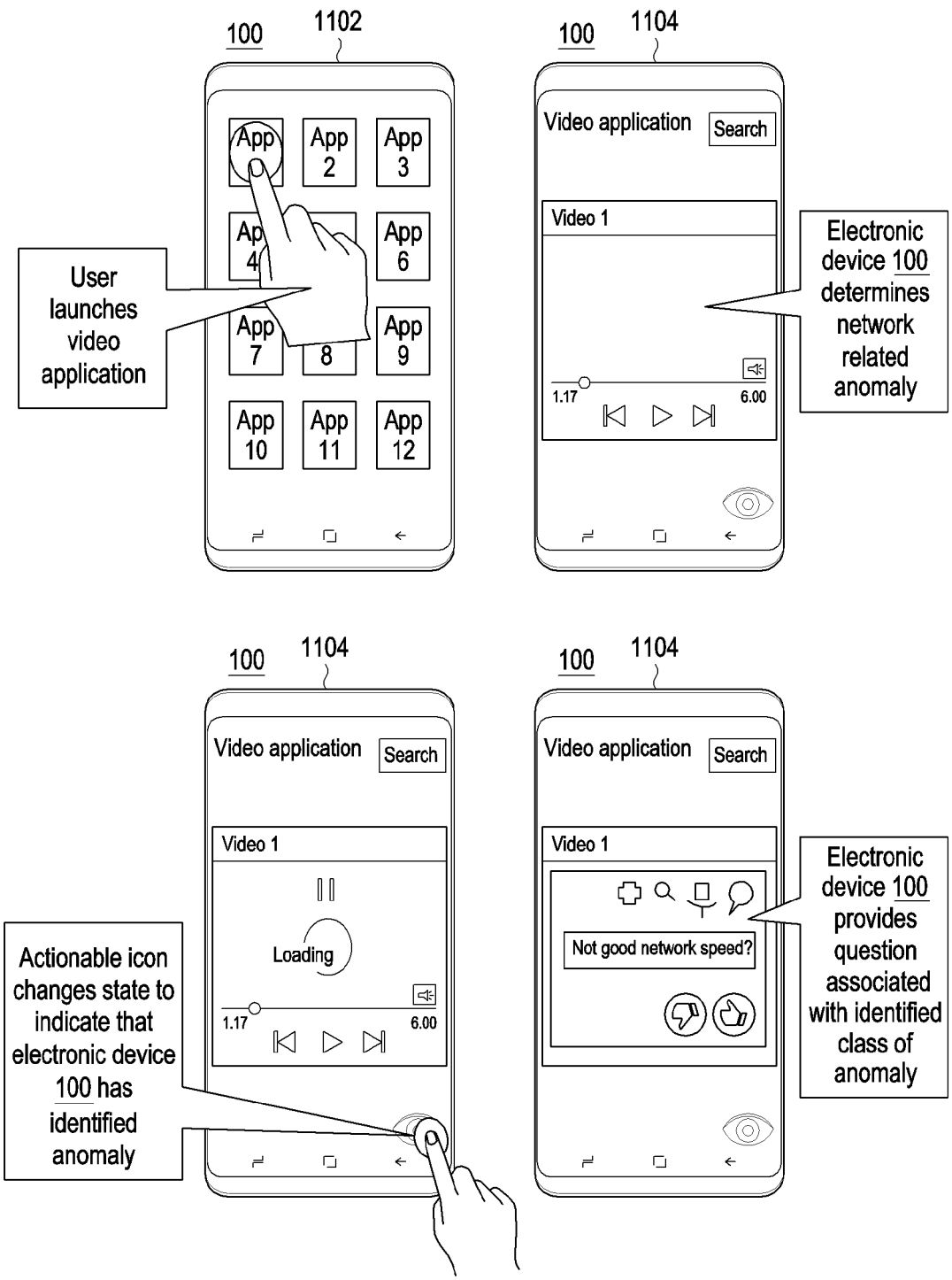

[Fig. 11]
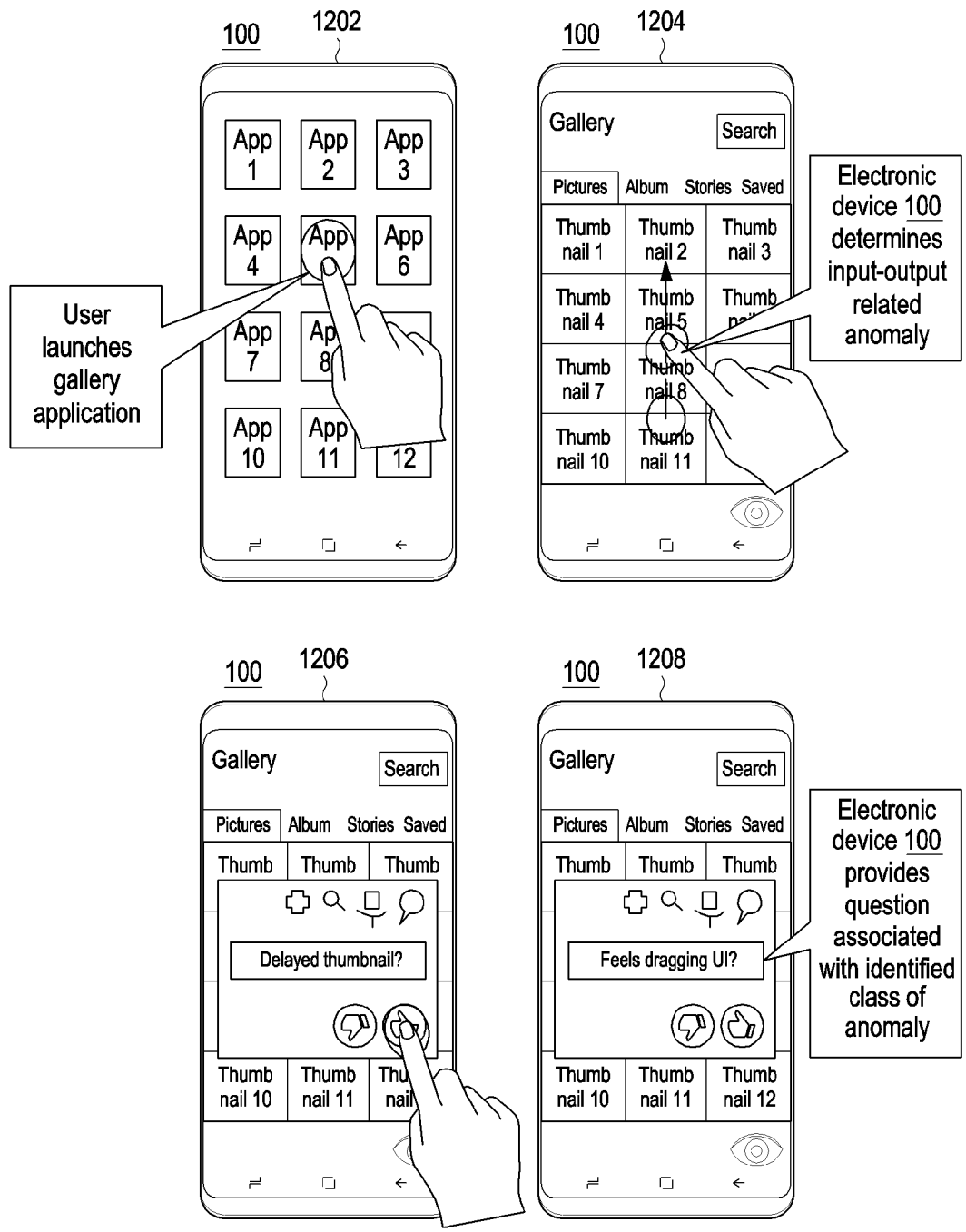

[Fig. 12]
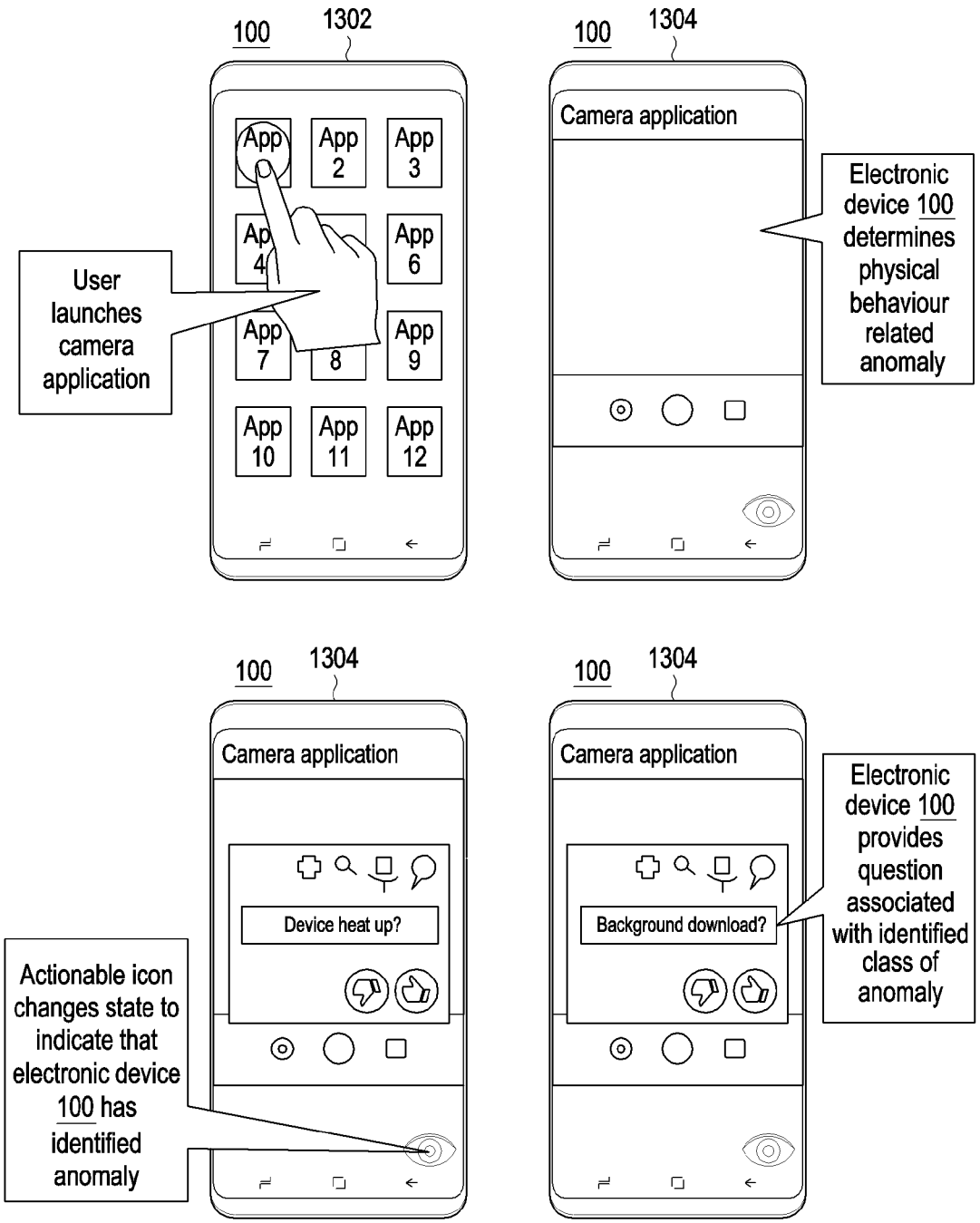

[Fig. 13]
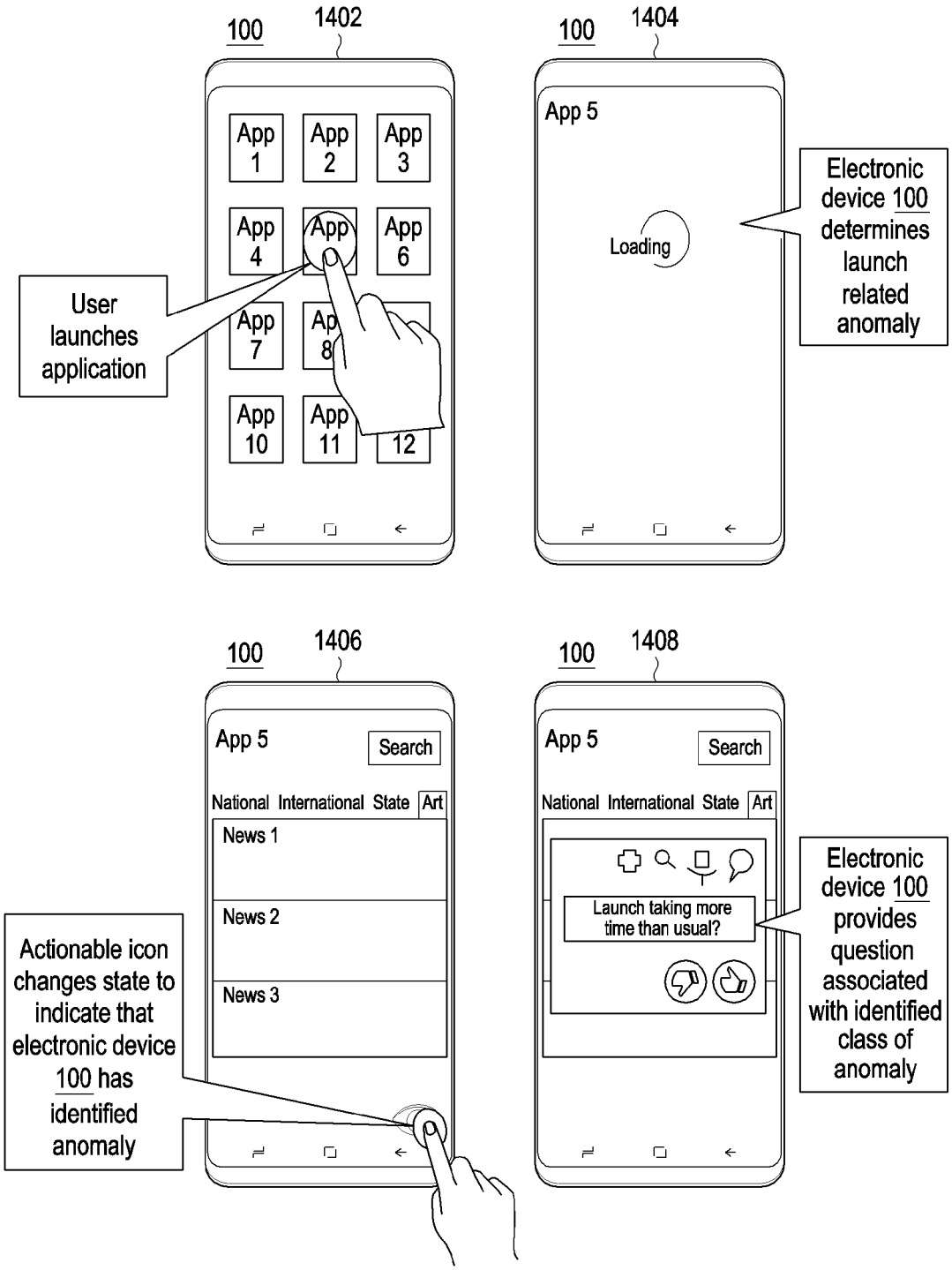

ELECTRONIC DEVICE AND ON-DEVICE METHOD FOR ENHANCING USER EXPERIENCE IN ELECTRONIC DEVICE

PRIORITY

This application is a National Phase Entry of International Application No. PCT/KR2019/002749, which was filed on Mar. 8, 2019, and claims priority to Indian Patent Application Nos. 201841008695 (PS) and 201841008695 (CS) filed in the Indian Intellectual Property Office on Mar. 9, 2018 and Dec. 7, 2018, respectively, the content of each of which is incorporated herein by reference.

TECHNICAL FIELD

The embodiments herein relate to device management, and more particularly, to electronic devices and on-device method for enhancing user experience in an electronic device.

BACKGROUND ART

In general, performance of an electronic device may be determined as a function of one or more parameters such as memory usage, input-out performance, processor utilization, and the like. However, deviation in the one or more parameters may lead to anomalies in the performance of electronic device. Many a time the anomalies in the performance of the electronic device may frustrate users. The performance of the electronic device varies based on the one or more parameters such as user behavior, installed applications, foreground and background tasks, and the like.

Conventionally, remedies to the anomalies in the performance of the electronic device is determined using:
 a) A white list based performance control mechanism; and
 b) A reactive handling of issues in the electronic device.

The above information is presented as background information only to help the reader to understand the present invention. Applicants have made no determination and make no assertion as to whether any of the above might be applicable as prior art with regard to the present application.

DISCLOSURE OF INVENTION

Technical Problem

However, in the aforementioned two cases, the remedies determined to the anomalies in the performance of the electronic device are curative and not preventive in nature. Further, there is no mechanism by which the electronic device can address reoccurrence of the anomalies in the performance of the electronic device. Also, the anomalies in the performance determined by the electronic device may not reflect the anomalies in the performance experienced by the user.

Furthermore, different users may encounter different types of anomalies in the performance of the electronic device. There is no mechanism by which the remedies determined for an individual user can be shared with other users to address a similar anomaly in the performance of the electronic device.

The principal object of the embodiments herein is to provide an electronic device and on-device method for enhancing user experience in an electronic device.

Another object of the embodiments herein is to monitor a plurality of parameters associated with the electronic device and identify the anomaly associated with the electronic device based on the plurality of parameters.

Another object of the embodiments herein is to identify a class of anomaly into which the determined anomaly belongs using an iterative re-trainable model.

Another object of the embodiments herein is to generate at least one question associated with the identified class of anomaly using a generative model and present it to a user of the electronic device.

Another object of the embodiments herein is to receive a user input to the at least one question and perform at least one action to enhance the user experience in the electronic device.

Another object of the embodiments herein is to save the user input to the at least one question as indices and share the indices with a remote server.

Another object of the embodiments herein is to receiving updated indices from the remote server and retraining the electronic device for predicting the anomaly associated with the electronic device.

Solution to Problem

Accordingly, the embodiments herein provide an on-device method for enhancing user experience in an electronic device. The method includes monitoring a plurality of parameters associated with an operation of the electronic device. The method includes identifying an anomaly associated with the electronic device based on the plurality of parameters associated with the operation of the electronic device and identifying a class of anomaly to which the anomaly associated with the electronic device belongs using a first on-device model. Further, the method includes presenting at least one question associated with the identified class of anomaly to user of the electronic device using on a second on-device model and receiving at least one user input for the at least one question. Furthermore, the method includes performing at least one action for enhancing the user experience based on the at least one user input for the at least one question.

Accordingly, embodiments herein provide an electronic device for determining and ascertaining an anomaly. The electronic device includes a memory, a processor and an anomaly management engine. The anomaly management engine is configured to monitor a plurality of parameters associated with an operation of the electronic device, where the plurality of parameters associated with the operation of the electronic device is at least one of a device state, a device behavior and a user interaction on the electronic device. The anomaly management engine is also configured to identify an anomaly associated with the electronic device based on the plurality of parameters associated with the operation of the electronic device and identify a class of anomaly to which the anomaly associated with the electronic device belongs using a first on-device model. Further, the anomaly management engine is configured to present at least one question associated with the identified class of anomaly to user of the electronic device using a second on-device model and receive at least one user input for the at least one question. Furthermore, the anomaly management engine is configured to perform at least one action for enhancing the user experience based on the at least one user input for the at least one question.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 2A is a block diagram of the electronic device for enhancing user experience in an electronic device, according to an embodiment as disclosed herein;

FIG. 2B is a block diagram of an anomaly management engine of the electronic device, according to an embodiment as disclosed herein;

FIG. 3 is a block diagram of a remote server for receiving indices from a plurality of electronic devices and determining updated indices, according to an embodiment as disclosed herein.

FIG. 4 is a flow chart illustrating an on-device method for enhancing user experience in an electronic device, according to an embodiment as disclosed herein;

FIGS. 6A-6D are example states of an actionable icon on UI of the electronic device indicating possible actions in identifying the anomaly associated with the electronic device and performing at least one action for enhancing the user experience, according to an embodiment as disclosed herein;

FIG. 7 is an example illustrating the UI providing at least one question associated with an identified class of anomaly and performing at least one action for enhancing the user experience, according to an embodiment as disclosed herein;

FIG. 8 is another example illustrating the UI providing the at least one question associated with the identified class of anomaly for ascertaining the identified anomaly and determining severity of the identified anomaly, according to an embodiment as disclosed herein;

FIG. 9 illustrates an example scenario for performing the at least one action for enhancing the user experience when an interaction related anomaly is identified in the electronic device, according to an embodiment as disclosed herein;

FIG. 10 illustrates an example scenario for performing the at least one action for enhancing the user experience when a network related anomaly is identified in the electronic device, according to an embodiment as disclosed herein;

FIG. 11 illustrates an example scenario for performing the at least one action for enhancing the user experience when an input-output related anomaly is identified in the electronic device, according to an embodiment as disclosed herein;

FIG. 12 illustrates an example scenario for performing the at least one action for enhancing the user experience when a physical behavior related anomaly is identified in the electronic device, according to an embodiment as disclosed herein; and FIG. 13 illustrates an example scenario for performing the at least one action for enhancing the user experience when an application launch related anomaly is identified in the electronic device, according to an embodiment as disclosed herein.

MODE FOR THE INVENTION

Figure 1:
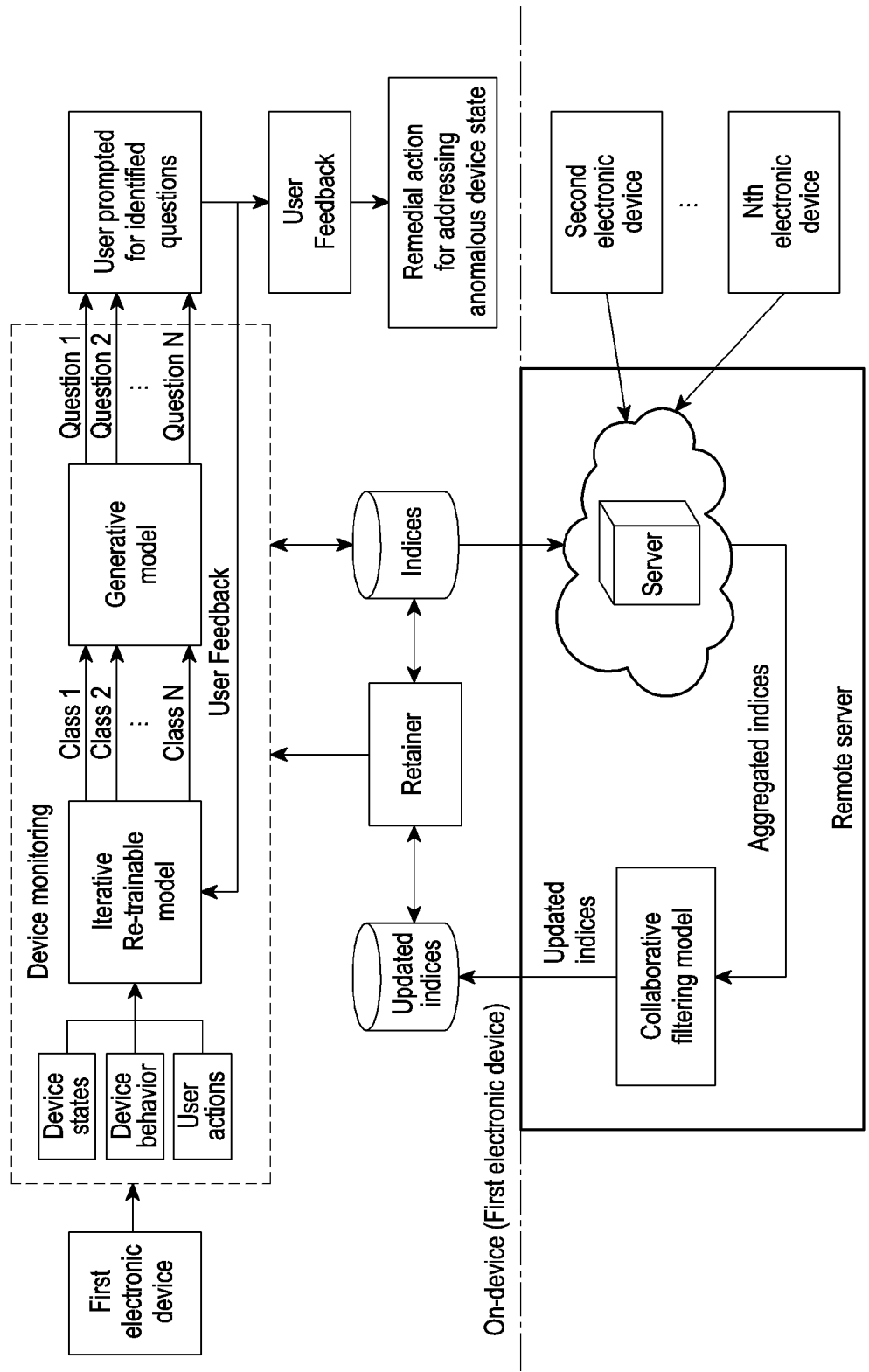
FIG. 1 is system diagram including an electronic device and a remote server for enhancing user experience in an electronic device, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide an on-device method for enhancing user experience in an electronic device. The method includes monitoring a plurality of parameters associated with an operation of the electronic device. The method includes identifying an anomaly associated with the electronic device based on the plurality of parameters associated with the operation of the electronic device and identifying a class of anomaly to which the anomaly associated with the electronic device belongs using a first on-device model. Further, the method includes presenting at least one question associated with the identified class of anomaly to user of the electronic device using on a second on-device model and receiving at least one user input for the at least one question. Furthermore, the method includes performing at least one action for enhancing the user experience based on the at least one user input for the at least one question.

In an embodiment, the class of anomaly into which the anomaly associated with the electronic device belongs is identified from a plurality of predefined classes of anomaly.

In an embodiment, the first on-device model is an iterative re-trainable model.

In an embodiment, the second on-device model is a generative model.

In an embodiment, the iterative re-trainable model is retrained based on the on at least one of the device state, the device behavior and the user interaction on the electronic device.

In an embodiment, performing, by the electronic device, at least one action for enhancing the user experience based on the at least one user input for the at least one question includes ascertaining, by the electronic device, the anomaly associated with the electronic device based on the at least one user input for the at least one question.

In an embodiment, performing, by the electronic device, at least one action for enhancing the user experience based on the at least one user input for the at least one question includes identifying, by the electronic device, a remedial action for the anomaly associated with the electronic device based on the at least one user input for the at least one question.

In an embodiment, the method further includes providing the user input as a feedback to the iterative re-trainable model for enhancing identification of the class of anomaly.

In an embodiment, the method further includes saving the user input for the at least one question as indices and uploading the indices to a remote server. The method also includes receiving updated indices from the remote server and performing the retraining of the iterative re-trainable model.

In an embodiment, the updated indices are obtained by a remote server by receiving the indices from a plurality of electronic devices. Further, the method includes performing a collaborative filtering on the indices from the plurality of electronic devices and obtaining the updated indices.

In an embodiment, the at least one question is presented as an actionable icon on a screen of the electronic device.

In an embodiment, the device state is predicted by monitoring at least one of a GPU utilization, a CPU utilization, a memory of the electronic device, and the like.

In an embodiment, the anomaly associated with the electronic device is predicted using a pre-defined threshold associated with at least one of the device state, the device behavior and the user interaction on the electronic device.

Unlike to the conventional methods and systems, the proposed method includes providing an online retraining of models in the electronic device based on the user inputs.

Referring now to the drawings, and more particularly to FIGS. 1 through 14, where similar reference characters denote corresponding features consistently throughout the figures, there are shown preferred embodiments.

FIG. 1 is system diagram including the electronic device 100 and the remote server 200 for enhancing user experience in the electronic device 100, according to an embodiment as disclosed herein.

Conventional methods and systems provide a white list based performance control for the anomalies detected by the electronic device. Also, conventional methods and systems provide reactive handling of anomalies in the electronic device (e.g. thermal). However, conventional methods and systems do not consider the fact that the device behaviour varies based on various parameters such as user behavior, applications installed in the electronic device, foreground and background tasks, etc. Further, conventional methods and systems are not capable of proactively detecting anomalies and asking user of the device to confirm the detected anomalies. Also, the conventional methods and systems are not able to prevent reoccurrence of previously detected anomalies.

Unlike conventional methods and systems, methods proposed herein are user centric and include self-diagnostic techniques for identifying the anomalies, getting the identified anomalies ascertained by the user and avoiding reoccurrence of the anomalies in an intuitive manner, by providing remedial actions for the identified anomalies.

Referring to the FIG. 1, consider a first electronic device which identifies the anomaly associated with the electronic device by monitoring at least one of the device state, the device behaviour and the user interactions on the electronic device. Further, the iterative-retainable model determines the class into which the identified anomaly belongs, from the pre-defined set of classes. The generative model identifies the questions associated with the determined class of the anomaly and presents a question to the user. Further, the first electronic device is ascertained that the identified anomaly is also experienced by the user, when the user response to the question confirms the identified anomaly. The user response to the question is saved as the indices and also used as a feedback to the iterative-retainable model for better identification of the classes of the anomaly. Further, based on the ascertained anomaly, a remedy to the identified anomaly may be determined by the first electronic device.

The first electronic device along with a plurality of electronic devices such as a second electronic device, a third electronic device up to Nth electronic device share the indices with the remote server/cloud server. The remote server aggregates the indices received from the plurality of electronic devices and performs the collaborative filtering on the aggregated indices to obtain the updated indices. Further, the remote server shares the updated indices with the plurality off electronic devices to enable the plurality of electronic devices to enhance an efficiency of the identification of the anomalies.

FIG. 2A is a block diagram of the electronic device 100 for enhancing user experience in the electronic device 100, according to an embodiment as disclosed herein.

Referring to the FIG. 2A, the electronic device 100 can be, for example, a laptop, a Personal Computer, a mobile phone, a smart phone, Personal Digital Assistant (PDA), a tablet, a wearable device, or the like. In an embodiment, the electronic device 100 can include an anomaly management engine 120, a processor 140, a memory 160 and a display 180.

In an embodiment, the anomaly management engine 120 is configured to monitor the plurality of parameters associated with the operation of the electronic device 100 and identify the anomaly associated with the electronic device 100 based on the plurality of parameters associated with the operation of the electronic device 100. The plurality of parameters associated with the operation of the electronic device 100 is at least one of the device state, the device behavior and the user interaction on the electronic device 100. The device state can be for example, status condition of at least one of the CPU, the GPU, the memory etc of the electronic device 100. The device behavior can be for example, a buffering duration, frames per second (FPS) behavior, thermal behavior, page fault statistics, etc. The user interaction on the electronic device 100 can be for example, an application launch and associated behavior, gestures performed on a screen of the electronic device 100 such as swiping, scrolling, jittery etc. Further, the anomaly management engine 120 identifies the class of anomaly to which the identified anomaly belongs and presents the at least one question associated with the identified class of anomaly to user of the electronic device 100. The class of anomaly is identified from the plurality of predefined classes of anomaly which are stored in the anomaly management engine 120.

For example, consider that the anomaly management engine 120 predicts the anomaly as overheating of a back panel of the electronic device 100. Further, based on the class of the overheating anomaly, the anomaly management engine 120 presents the at least one question to the user such as for example, 'Is device overheating?', 'Experiencing rise in a device temperature?' and the like. Further, the anomaly management engine 120 receives the at least one user input for the at least one question. When the at least one user input confirms the identified anomaly of the anomaly management engine 120, then the anomaly management engine 120 performs at least one action for enhancing the user experience based on the at least one user input for the at least one question. The at least one action for enhancing the user experience is at least one of ascertaining the anomaly associated with the electronic device 100 based on the at least one user input for the at least one question and identifying the remedial action for the anomaly associated with the electronic device 100 based on the at least one user input for the at least one question.

The anomaly management engine 120 is also configured to determine various states of an actionable icon which is provided on the display 180. The actionable icon indicates the various states of the electronic device 100 which are encountered while identifying the anomaly and performing at least one action for enhancing the user experience, such as system intelligence of the electronic device 100 is in a disabled state, normal state, anomaly predicted state, anomaly ascertained state, etc (further described in FIGS. 6A-6D). The anomaly management engine 120 is also configured to determine the remedial measure to address the identified anomaly, so that the identified anomaly does not re-occur in the electronic device 100.

Further, the anomaly management engine 120 is also configured to save the at least one user input for the at least one question as indices in the electronic device 100. Further, the anomaly management engine 120 is configured to upload the indices to the remote server 200, which also receives the indices from the plurality of electronic devices. The anomaly management engine 120 then receives the updated indices from the remote server 200 and retrains the iterative re-trainable model to be able to provide better predictions based on the updated indices.

In an embodiment, the processor 140 is configured to interact with the hardware elements such as the anomaly management engine 120, the memory 160 and the display 180 for determining the anomaly in the electronic device 100.

In an embodiment, the memory 160 can include non-volatile storage elements.

Examples of such non-volatile storage elements may include magnetic hard discs, optical discs, floppy discs, flash memories, or forms of electrically programmable memories (EPROM) or electrically erasable and programmable (EE-PROM) memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In some examples, the memory 160 is configured to store larger amounts of information than the memory. In certain examples, a non-transitory storage medium may store data that can, over time, change (e.g., in Random Access Memory (RAM) or cache).

In an embodiment, the display 180 can be a portion of the screen of the electronic device 100 which is used to display the at least one question based on the class of the anomaly. The display 180 is also configured to display the actionable icon which indicates the various states of the electronic device 100 in identifying the anomaly (further described in FIGS. 6A-6D).

Although the FIG. 2A shows the hardware elements of the electronic device 100 but it is to be understood that other embodiments are not limited thereon. In other embodiments, the electronic device 100 may include less or more number of elements. Further, the labels or names of the elements are used only for illustrative purpose and does not limit the scope of the invention. One or more components can be combined together to perform same or substantially similar function for enhancing the user experience in the electronic device 100.

FIG. 2B is a block diagram of the anomaly management engine 120 of the electronic device 100, according to an embodiment as disclosed herein.

Referring to the FIG. 2B, in an embodiment, the anomaly management engine 120 can include an anomaly identification engine 122, the iterative re-trainable model 124, the generative model 126, an anomaly assertion engine 128 and an indicesC database 130.

In an embodiment, the anomaly identification engine 122 is configured to monitor the plurality of parameters associated with the operation of the electronic device 100 which include at least one of the device state, the device behavior and the user interactions with respect to the pre-defined threshold. The pre-defined threshold for identifying the anomaly may be for example area specific, etc. For example, a predefined thermal threshold is used to determine a device overheating anomaly. The predefined thermal threshold may be different for India (a tropical country) and Iceland (a cold country).

Further, the anomaly identification engine 122 is configured to identify the anomaly when the at least one of the device state, the device behavior and the user interactions, crosses the pre-defined threshold.

The first on-device model is an iterative re-trainable model 124. In an embodiment, the iterative re-trainable model 124 is configured to receive a time series data and perform an asynchronous event processing. The time series data is a time series input of the at least one of the device state, the device behavior and the user interaction on the electronic device 100. Further, the iterative re-trainable model 124 includes a plurality of models which are configured to identify the class of the anomaly into which the predicted anomaly belongs. The class of the anomaly is determined from a pre-determined set of classes represented by the plurality of models by the iterative retrainable model 124. Each of the class of the anomaly is associated with a set of anomalies. For example, all scroll related anomalies are categorized under the same class of the anomaly.

Further, the iterative re-trainable model 124 is also configured to assign a probability score for the predicted anomaly after classifying the anomaly into the class of anomaly.

For example, consider that the anomaly management engine 122 predicts a scroll related anomaly. The iterative re-trainable model 124 determines the possible classes into which the scroll related anomaly can be classified and assigns the probability scores as shown in Table. 1.

TABLE 1

| Class of anomaly | Probability score |
| --- | --- |
| Class 1-FPS drop | 0.68 |
| Class 2-Swipe gesture | 0.52 |
| Class N . . . | |

The iterative re-trainable model 124 is re-trained based on the user behavior and the at least one user input to the at least one question with a minimal time. Further, the iterative re-trainable model 124 is also re-trained when the updated indices are received from the remote server 200. The second on-device model is a generative model 126. In an embodiment, the generative model 126 is configured to receive a time series anomalous behavior output from the iterative re-trainable model 124 and determines the at least one question to be provided to the user, based on the class of the anomaly. Further, the at least one question is presented to the user on the display 180. The generative model 126 is re-trained based on a feedback provided by the anomaly assertion engine 128.

In an embodiment, the anomaly assertion engine 128 is configured to receive the at least one user input to the at least one question provided by the generative model 126. The user input indicates one of the two cases, i.e., user confirms the identified anomaly and the user has not experienced the predicted anomaly.

When the user confirms the identified anomaly, the anomaly assertion engine 128 is configured to re-calibrate the probability score assigned by the iterative re-trainable model 124 i.e., the re-calibrated probability score is higher than the probability score assigned by the iterative re-trainable model 124. Further, the anomaly assertion engine 128 performs at least one action for enhancing the user experience based on the at least one user input for the at least one question ascertains that the identified anomaly is also experienced by the user.

In conjunction with the example provided above, consider that the user confirms the identified scroll related anomaly. Therefore, based on the at least one user input to the at least one question provided by the generative model 126, the anomaly assertion engine 128 re-calibrates and assigns a higher probability score as shown in Table. 2.

TABLE 2

| Class of anomaly | Probability score |
| --- | --- |
| Class 1-FPS drop | 0.8 |
| Class 2-Swipe gesture | 0.52 |
| Class N . . . | |

Further, the anomaly assertion engine 128 also provides the feedback to the generative model 126 for generating additional questions for further narrowing down the anomaly, if required. When the user has not experienced the identified anomaly, the anomaly assertion engine 128 is configured to re-calibrate the probability score assigned by the iterative re-trainable model 124 i.e., the re-calibrated probability score is lower than the probability score assigned by the iterative re-trainable model 124.

In conjunction with the example provided above, consider that the user input to the at least one question indicates that the user has not experienced the identified scroll related anomaly. Therefore, based on the at least one user input to the at least one question provided by the generative model 126, the anomaly assertion engine 128 recalibrates and assigns a lower probability score as shown in Table. 3.

TABLE 3

| Class of anomaly | Probability score |
| --- | --- |
| Class 1-FPS drop | 0.45 |
| Class 2-Swipe gesture | 0.52 |
| Class N . . . | . . . |

Furthermore, the anomaly assertion engine 128 is also configured to save the at least one user input to the at least one question as the indices in the indices database 130. The anomaly assertion engine 128 also uploads the indices along with a user profile to the remote server 200. However, the anomaly assertion engine 128 filters any sensitive or personally identifiable information associated with the user and uploads in an anonymous manner. The user profile includes user demographics, type (gaming, streamer etc.) and user preferences, etc. Further, the user profile also includes user action with respect to the at least one question, where the user may choose to answer the at least one question or the user may choose to ignore the at least one question. If the user chooses to ignore the at least one question provided by the generative model 126, then the anomaly assertion engine 128 records the user choice as part of the user profile. However, if the anomaly re-occurs and the user continues to ignore the at least one question provided by the generative model 126 beyond a pre-defined threshold, then the anomaly assertion engine 128 automatically applies a remedial measure when the anomaly re-occurs. Therefore, the anomaly assertion engine 128 ensures that all the identified anomalies are addressed.

In an embodiment, the indices database 130 is configured to store the at least one user input to the at least one question as the indices. Further, the updated indices received from the remote server 200 are also stored in the indices database 130.

FIG. 3 is a block diagram of the remote server 200 for receiving the indices from the plurality of electronic devices and determining the updated indices, according to an embodiment as disclosed herein.

In an embodiment, the remote server 200 can include an indices management engine 210, a processor 220 and a memory 230.

The indices management engine 210 includes an indices receiver engine 212, a collaborative filtering engine 214 and an updated indices determination engine 216.

In an embodiment, the indices receiver engine 212 is configured to receive the indices from a plurality of electronic devices. Further, the indices receiver engine 212 is also configured to determine aggregated indices using the indices received from the plurality of electronic devices, as shown in Table. 4.

TABLE 4

| User# | Question cat#1-choice | Question cat#1N-choice |
|---|---|---|
| User1 | Choice#x | ... |
| User2 | Choice#x' | ... |
| UserX | No-Choice | ... |
| UserN | Choice#x" | ... |

In an embodiment, the collaborative filtering engine 214 is configured to perform the collaborative filtering to obtain the user profiles which are similar to that of the candidate user and to determine values for missing indices. For example, in Table. 4, the user choice of UserX for a first question provided is 'No-choice', i.e., there is no value in the indices which is associated with the first question for UserX. In an embodiment, the updated indices determination engine 216 is configured to obtain the updated indices based on the output from the collaborative filtering engine 214. Further, the updated indices determination engine 216 is also configured to share the updated indices with the electronic device 100.

In an embodiment, the processor 220 is configured to interact with the hardware elements such as the indices receiver engine 210, the collaborative filtering engine 214, updated indices determination engine 216, memory 230 for obtaining the updated indices.

In an embodiment, the memory 230 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 is configured to store larger amounts of information than the memory. In certain examples, a non-transitory storage medium may store data that can, over time, change (e.g., in Random Access Memory (RAM) or cache).

Although the FIG. 3 shows the hardware elements of the remote server 200 but it is to be understood that other embodiments are not limited thereon. In other embodiments, the remote server 200 100 may include less or more number of elements. Further, the labels or names of the elements are used only for illustrative purpose and does not limit the scope of the invention. One or more components can be combined together to perform same or substantially similar function obtaining the updated indices.

FIG. 4 is a flow chart 400 illustrating an on-device method for enhancing the user experience in the electronic device 100, according to an embodiment as disclosed herein.

Referring to the FIG. 4, at step 402, the electronic device 100 monitors the plurality of parameters associated with the operation of the electronic device 100. For example, in the electronic device 100 as illustrated in the FIG. 2A, the anomaly management engine 120 can be configured to monitor the plurality of parameters associated with the operation of the electronic device 100.

At step 404, the electronic device 100 identifies the anomaly associated with the electronic device 100 based on the plurality of parameters associated with the operation of electronic device 100. For example, in the electronic device 100 as illustrated in the FIG. 2A, the anomaly management engine 120 can be configured to identify the anomaly associated with the electronic device 100 based on the plurality of parameters associated with the operation of electronic device 100.

At step 406, the electronic device 100 identifies the class of anomaly to which the anomaly associated with the electronic device 100 belongs using the first on-device model. For example, in the electronic device 100 as illustrated in the FIG. 2A, the anomaly management engine 120 can be configured to identify the class of anomaly to which the anomaly associated with the electronic device 100 belongs using the first on-device model.

At step 408, the electronic device 100 presents the at least one question associated with the identified class of anomaly to the user of the electronic device 100 using the second on-device model. For example, in the electronic device 100 as illustrated in the FIG. 2A, the anomaly management engine 120 can be configured to presents the at least one question associated with the identified class of anomaly to the user of the electronic device 100 using the second on-device model.

At step 410, the electronic device 100 receives the user input for the at least one question. For example, in the electronic device 100 as illustrated in the FIG. 2A, the anomaly management engine 120 can be configured to receive the user input for the at least one question.

At step 412, the electronic device 100 performs the at least one action for enhancing the user experience based on the at least one user input for the at least one question. For example, in the electronic device 100 as illustrated in the FIG. 2A, the anomaly management engine 120 can be configured to perform the at least one action for enhancing the user experience based on the at least one user input for the at least one question.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
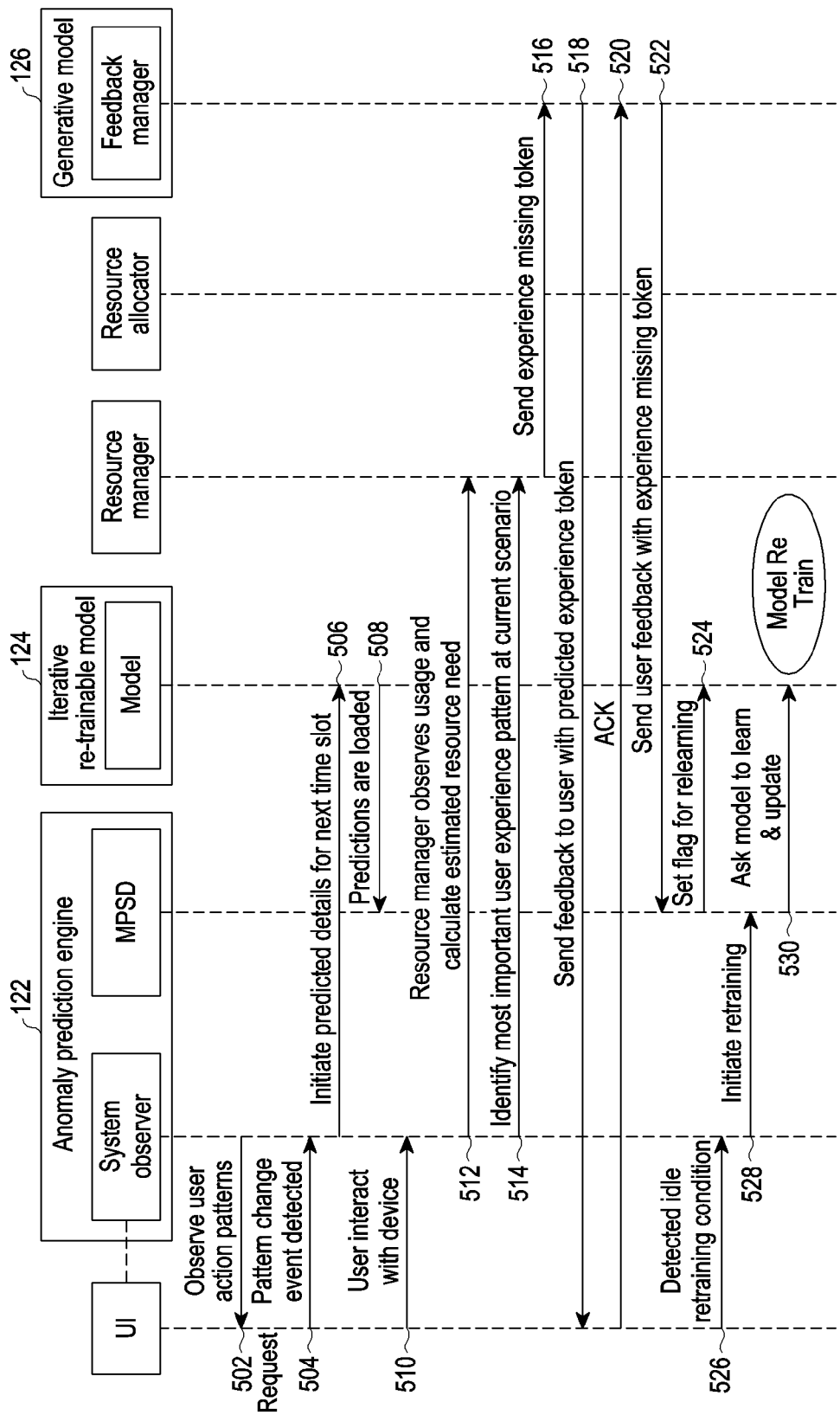
FIG. 5 is a control flow diagram for determining the anomaly and performing relearning of models of an iterative-retrainable model in the electronic device, according to an embodiment as disclosed herein.

FIG. 5 is a control flow diagram for determining the anomaly and performing the relearning of models of the iterative-retrainable model 124 in the electronic device 100, according to an embodiment as disclosed herein.

A system observer, a Multiple Parameters Single Decision (MPSD) model, a resource manager are part of system intelligence. The system intelligence ensures that the operations are personalized for the user. The MPSD operates at the user space i.e., at the framework level as well as at a kernel of the electronic device 100.

At step 502, the system observer continuously monitors the plurality of parameters associated with the electronic device 100. At step 504, a change in the user behavior is detected at the UI end of the electronic device 100 and the same is reported to the system observer. At step 506, the system observer which lies within the anomaly identification engine 122, informs the iterative-retainable model 124 to initiate predicted details for a next time slot. At step 508, the iterative-retainable model 124 informs the MPSD that the predictions have been loaded.

At step 510, the anomaly identification engine 122 detects the user interaction. At step 512, the system observer sends intimation to the resource manager to observe a usage pattern and calculate an estimated resource needed for the user actions. At step 514, the system observer also tells the resource manager to identify an important user experience pattern at a current scenario.

At step 516, the resource manager determines that experience information is missing and sends an experience missing token to the feedback manager which is part of the generative model 126. The feedback manager is configured to provide the at least one question to the user and receive the at least one user input to the at least one question provided and share the same with the generative model 126.

At step 518, the feedback manager sends the feedback to the user with a predicted experience token to the UI and receives an acknowledgement at step 520.

At step 522, the feedback manager sends a user feedback with experience missing token to the MPSD. At step 524, in response to the feedback with experience missing token, the MPSD sets a relearning flag for the models in the iterative-retainable model 124. Once the relearning flag has been set, the UI waits for an idle relearning conditions to occur such as for example, when the electronic device 100 is being charged.

At step 526, the UI of the electronic device 100 detects the idle retraining condition and informs the same to the system observer. At step 528, the system observer informs the MPSD to initiate the relearning of the models in the iterative-retainable model 124. At step 530, the MPSD sends a command to the iterative-retainable model 124 to initiate relearning and update the models. Therefore, the iterative-retainable model 124 is retrained each time when the pattern of the user actions is changed to ensure enhanced and accurate prediction of the anomaly associated with the electronic device 100.

FIGS. 6A-6D are example states of an actionable icon on UI of the electronic device 100 indicating possible actions in identifying the anomaly associated with the electronic device 100 and performing the at least one action for enhancing the user experience, according to an embodiment as disclosed herein.

The actionable icon provided on the UI of the electronic device 100 provides the various states of the electronic device 100. Further, the user can click on the actionable icon to know details of the various states of the electronic device 100.

Referring to the FIG. 6A, the actionable icon indicates that the user has disabled a system intelligence of the electronic device 100. Therefore, the system will not adapt to user action. However the previously learned states of the electronic device 100 will be used to sustain the identification of the anomaly associated with the electronic device 100.

Referring to the FIG. 6B, the actionable icon indicates that the electronic device 100 is in the normal state. The electronic device 100 has not detected any anomaly and the electronic device 100 is in an idle condition.

Referring to the FIG. 6C, the actionable icon indicates that the electronic device 100 has detected a possible anomaly based on the at least one of the device state, the device behaviour and the user interactions on the electronic device 100. Further, the electronic device 100 also identifies the class of the anomaly into which the identified anomaly belongs and the question associated with the class of the anomaly is presented to the user, when the user selects the actionable icon. The user may choose to respond or ignore the question provided by the electronic device 100.

Referring to the FIG. 6D, the actionable icon indicates that the electronic device 100 has received the user input to the question presented to the user based on the class into which the identified anomaly belongs. Further, the iterative re-trainable engine 124 is updated based on the user input and the indices received from the remote server 200. Furthermore, the electronic device 100 determines the remedial action required to address the identified anomaly.

The various states of the actionable icon provided on the UI of the electronic device 100 are not limited to the provided states.

FIG. 7 is an example illustrating the UI providing the at least one question associated with the identified class of anomaly and performing the at least one action for enhancing the user experience, according to an embodiment as disclosed herein.

Referring to the FIG. 7, in conjunction with FIG. 6C, a feedback and recommendation drawer is launched when the user clicks the actionable icon provided on the UI of the electronic device 100. The user can interact with the feedback and recommendation drawer in various forms such as chat based interaction, voice based interaction, touch based interaction and automatic interaction.

The chat based interaction includes a conversational UI which can be selected by the user to interact with the feedback and recommendation drawer. For example, in FIG. 7, the user can respond to the question provided to the feedback and recommendation drawer in the chat interface. In another example, the user can respond to the question provided to the feedback and recommendation drawer through a voice chat. The feedback and recommendation drawer can be provided with embedded automatic speech recognition (ASR) to provide the voice chat feature to the user.

The feedback and recommendation drawer may also provide questions to the user which can be answered to with "Yes" and "No" only, or by selecting some button indicating "Yes" and "No".

In another example, the feedback and recommendation drawer may be completely automatic i.e., the feedback and recommendation drawer is completely handled by the electronic device 100.

FIG. 8 is another example illustrating the UI providing the at least one question associated with the identified class of anomaly for ascertaining the identified anomaly and determining severity of the identified anomaly, according to an embodiment as disclosed herein.

The feedback and recommendation drawer is launched when user clicks the actionable icon provided on the UI of the electronic device 100. The feedback and recommendation drawer includes a user rating based system adaption.

The feedback and recommendation drawer includes options to quantify the user satisfaction in a particular scenario or usage of the electronic device 100. Further, the electronic device 100 provides a series of follow up questions to narrow down the identified anomaly. The feedback to the iterative-retainable engine 124 will enable correct data gathering in the electronic device 100. Further, based on the user ratings and feedback, the severity of the identified anomaly is detected. Therefore, the feedback and recommendation drawer provides better accuracy of the predictions of the anomaly.

FIG. 9 illustrates an example scenario for performing the at least one action for enhancing the user experience when an interaction related anomaly is identified in the electronic device 100, according to an embodiment as disclosed herein.

Referring to the FIG. 9, at step 1002, consider that the user launches a news application from the menu screen of the electronic device 100. The electronic device 100 begins to monitor the plurality of parameters associated with the electronic device 100. At step 1004, the electronic device 100 detects the interaction related anomaly such as for example a scroll issue, a touch issue, jittery experience while performing action on the UI, low scroll speed, etc. The electronic device 100 determines that the interaction related anomaly may be due to multiple interactions that are required in the news application. At step 1006, the actionable icon present at the bottom of the UI of the news application changes the state to indicate that the electronic device 100 has identified the anomaly based on the interactions performed on the electronic device 100. Further, the electronic device 100 identifies the class of the anomaly into which the predicted anomaly belongs.

At step 1008, the electronic device 100 provides the question associated with the identified class of anomaly, for example 'Scroll is impressive?'. Further, the electronic device 100 receives the input from the user for the question displayed. If the user input confirms the anomaly identified by the electronic device 100, then the electronic device 100 performs at least one action based on the user input. The electronic device 100 may be ascertained that the anomaly predicted by the electronic device 100 is also experienced by the user. Furthermore, the electronic device 100 can identify the remedial action to address the identified anomaly.

If the user chooses to ignore the question provided by the electronic device 100 then of the anomaly identified by the electronic device 100 may not be addressed. However, the user choices are saved by the electronic device 100 as the indices and the indices are shared with the remote server 200. The remote server 200 also includes the indices received from the plurality of electronic devices which are used to determine the updated indices for the at least one of the device state, the device behavior and the user interaction. Furthermore, the updated indices are received by the electronic device 100 which is used to retrain the iterative re-trainable model 124 of the electronic device 100. When the user chooses to ignore the question provided by the electronic device 100, the electronic device 100 identifies the remedial action to address the predicted input-output related anomaly based on the updated indices received from the remote server 200.

FIG. 10 illustrates an example scenario for performing the at least one action for enhancing the user experience when a network related anomaly is identified in the electronic device 100, according to an embodiment as disclosed herein.

Referring to the FIG. 10, at step 1102, consider that the user launches a video application from the menu screen of the electronic device 100. The electronic device 100 is continuously monitoring the plurality of parameters associated with the electronic device 100. At step 1104 the user plays a video in the video application. The actionable icon present at the bottom of the UI of the video application indicates that the electronic device 100 is in the normal state and that there are no possible anomalies that are detected with respect to the electronic device 100.

At step 1106, the electronic device 100 detects multiple network related anomalistic behavior such as resource not available, network speed, scroll sluggish, etc. The electronic device 100 determines that the multiple anomalistic behavior may be caused due to the video application consuming more data from the network. Further, the actionable icon present at the bottom of the UI of the video application changes the state to indicate that the electronic device 100 has identified the anomaly associated with the electronic device 100.

At step 1108, the electronic device 100 identifies the class of the anomaly into which the identified network related anomaly belongs and provides the question associated with the identified class of anomaly for example 'Not good network speed?'. Further, the electronic device 100 receives the input from the user for the question displayed. If the user input confirms the anomaly identified by the electronic device 100, then the electronic device 100 performs the at least one action to enhance the user experience in the electronic device 100. In one of the instances, the electronic device 100 is ascertained that the anomaly identified by the electronic device 100 is also experienced by the user. In another instance, the electronic device 100 can identify the remedial action to address the identified anomaly.

At step 1108, if the user chooses to ignore the question provided by the electronic device 100 then of the anomaly identified by the electronic device 100 may not be addressed. However, the choices of the user are saved by the electronic device 100 as the indices and the indices are shared with the remote server 200. The remote server 200 also includes the indices received from the plurality of electronic devices which are used to determine the updated indices for the at least one of the device state, the device behavior and the user interaction. Furthermore, the updated indices are received by the electronic device 100 which is used to retrain the iterative re-trainable model 124 of the electronic device 100.

When the user chooses to ignore the question provided by the electronic device 100, the electronic device 100 identifies the remedial action to address the identified network related anomaly based on the updated indices received from the remote server 200.

FIG. 11 illustrates an example scenario for performing the at least one action for enhancing the user experience when an input-output related anomaly is identified in the electronic device 100, according to an embodiment as disclosed herein.

Referring to the FIG. 11, at step 1202, consider that the user launches a gallery application from the menu screen of the electronic device 100. The electronic device 100 is continuously monitoring the plurality of parameters associated with the electronic device 100. At step 1204, the electronic device 100 detects the input-output related anomaly such as for example a scroll issue, a touch issue, frame drop issue, etc. The electronic device 100 determines that the input-output related anomaly may be due to fragmented storage as the gallery application consumes more disk space. Further, the actionable icon present at the bottom of the UI of the gallery application changes the state to indicate that the electronic device 100 has identified the anomaly based on the input-output behaviour of the electronic device 100.

At step 1206, the electronic device 100 identifies the class of the anomaly into which the identified anomaly belongs and provides the question associated with the identified class of anomaly for example 'Delayed thumbnail?'. Further, the electronic device 100 receives the input from the user for the question displayed. In response to the user input, the electronic device 100 at step 1208 provides further questions such as 'Is the UI jittery?' to confirm the identified anomaly. If the user input confirms the anomaly identified by the electronic device 100, then the electronic device 100 performs the at least one action to enhance the user experience in the electronic device 100. In one of the instances, the electronic device 100 is ascertained that the anomaly predicted by the electronic device 100 is also experienced by the user. In another instance, the electronic device 100 can identify the remedial action to address the predicted anomaly.

At step 1208, if the user chooses to ignore the question provided by the electronic device 100 then of the anomaly identified by the electronic device 100 may not be addressed. However, the choices of the user are saved by the electronic device 100 as the indices and the indices are shared with the remote server 200. The remote server 200 also includes the indices received from the plurality of electronic devices which are used to determine the updated indices for the at least one of the device state, the device behavior and the user interaction. Furthermore, the updated indices are received by the electronic device 100 which is used to retrain the iterative re-trainable model 124 of the electronic device 100.

When the user chooses to ignore the question provided by the electronic device 100, the electronic device 100 identifies the remedial action to address the predicted input-output related anomaly based on the updated indices received from the remote server 200.

FIG. 12 illustrates an example scenario for performing the at least one action for enhancing the user experience when a physical behavior related anomaly is identified in the electronic device 100, according to an embodiment as disclosed herein.

Referring to the FIG. 12, at step 1302, consider that the user launches a camera application from the menu screen of the electronic device 100. The electronic device 100 is continuously monitoring the plurality of parameters associated with the electronic device 100. At step 1304, the electronic device 100 detects a change in the physical behaviour of the electronic device 100 when the camera application is accessed. The change in the physical behaviour is for example an increase in the device temperature/heating up of the electronic device 100.

At step 1306, the actionable icon present at the bottom of the UI of the camera application changes the state to indicate that the electronic device 100 has identified the anomaly based on the physical behaviour of the electronic device 100. Further, the electronic device 100 identifies the class of the anomaly into which the identified anomaly belongs and provides the question associated with the identified class of anomaly for example 'Device heat up?'.

Further, the electronic device 100 receives the input from the user for the question displayed. In response to the user input, the electronic device 100 at step 1308 provides further questions to confirm the identified anomaly. If the user input confirms the anomaly identified by the electronic device 100, then the electronic device 100 performs the at least one action to enhance the user experience in the electronic device 100. In one of the instances, the electronic device 100 is ascertained that the anomaly identified by the electronic device 100 is also experienced by the user. In another instance, the electronic device 100 can identify the remedial action to address the predicted anomaly.

At step 1308, if the user chooses to ignore the question provided by the electronic device 100 then of the anomaly predicted by the electronic device 100 may not be addressed. However, the choices of the user are saved by the electronic device 100 as the indices and the indices are shared with the remote server 200. The remote server 200 also includes the indices received from the plurality of electronic devices which are used to determine the updated indices for the at least one of the device state, the device behavior and the user interaction. Furthermore, the updated indices are received by the electronic device 100 which is used to retrain the iterative re-trainable model 124 of the electronic device 100.

When the user chooses to ignore the question provided by the electronic device 100, the electronic device 100 identifies the remedial action to address the predicted anomaly based on the updated indices received from the remote server 200.

FIG. 13 illustrates an example scenario for performing the at least one action for enhancing the user experience when an application launch related anomaly is identified in the electronic device, according to an embodiment as disclosed herein.

Referring to the FIG. 13, at step 1402, consider that the user launches an application i.e., app 5 from the menu screen of the electronic device 100. The electronic device 100 is continuously monitoring the plurality of parameters associated with the electronic device 100.

At step 1404, the electronic device 100 detects that the launch time of the app 5 is more than normal time taken for launching the app 5.

At step 1406, the app 5 is launched. The actionable icon present at the bottom of the UI of the app 5 changes the state to indicate that the electronic device 100 has identified the anomaly based on the behavior of the app 5. Further, the electronic device 100 identifies the class of the anomaly into which the identified anomaly belongs.

At step 1408, the electronic device 100 provides the question associated with the identified class of anomaly on the screen for example 'Launch taking more time than usual?'. Further, the electronic device 100 receives the input from the user for the question. Further, if the user input confirms the anomaly identified by the electronic device 100 at step 1406, then the electronic device 100 performs the at least one action to enhance the user experience in the electronic device 100. In one of the instances, the electronic device 100 is ascertained that the anomaly identified by the electronic device 100 is also experienced by the user. In another instance, the electronic device 100 can identify the remedial action to address the identified anomaly.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An on-device method for enhancing user experience in an electronic device, the method comprising:
monitoring, by the electronic device, a plurality of parameters associated with an operation of the electronic device, wherein the plurality of parameters associated with the operation of the electronic device comprise at least one of a device state, a device behavior and a user interaction on the electronic device, and the device state indicates a condition of at least one of a central processing unit (CPU), a graphical processing unit (GPU), and a memory of the electronic device;
identifying, by the electronic device, an anomaly of the electronic device based on the plurality of parameters associated with the operation of the electronic device;
identifying, by the electronic device, a class of anomaly to which the anomaly of the electronic device belongs using a first on-device model, wherein the first on-device model is configured to determine possible classes of anomaly into which the identified anomaly of the electronic device can be classified and assign a probability score for the identified anomaly of the electronic device to each of the possible classes of anomaly;

presenting, by the electronic device, at least one question associated with the identified class of anomaly to user of the electronic device using a second on-device model;

receiving, by the electronic device, at least one user input for the at least one question, wherein the probability score assigned to each of the possible classes of anomaly is re-calibrated according to the at least user input; and performing, by the electronic device, at least one action for enhancing the user experience based on the at least one user input for the at least one question.

2. The method of claim 1, wherein the class of anomaly into which the anomaly of the electronic device belongs is identified from a plurality of predefined classes of anomaly.

3. The method of claim 1, wherein the first on-device model is an iterative re-trainable model.

4. The method of claim 1, wherein the second on-device model is a generative model.

5. The method of claim 1, wherein performing, by the electronic device, at least one action for enhancing the user experience based on the at least one user input for the at least one question, comprises:

ascertaining, by the electronic device, the anomaly of the electronic device based on the at least one user input for the at least one question.

6. The method of claim 1, wherein performing, by the electronic device, at least one action for enhancing the user experience based on the at least one user input for the at least one question, comprises:

identifying, by the electronic device, a remedial action for the anomaly of the electronic device based on the at least one user input for the at least one question.

7. The method of claim 1, further comprises:

saving, by the electronic device, the at least one user input for the at least one question as indices;

uploading, by the electronic device, the indices to a remote server;

receiving, by the electronic device, updated indices from the remote server; and performing, by the electronic device, the retraining of the iterative re-trainable model.

8. An electronic device for determining an anomaly, the electronic device comprising:

a memory;

a processor coupled to the memory; and an anomaly management engine coupled to the memory and the processor, wherein the anomaly management engine is configured to:

monitor a plurality of parameters associated with an operation of the electronic device, wherein the plurality of parameters associated with the operation of the electronic device comprises at least one of a device state of the electronic device, a device behavior of the electronic device and a user interaction on the electronic device, and the device state indicates a condition of at least one of a central processing unit (CPU), a graphical processing unit (GPU), and the memory of the electronic device, identify an anomaly of the electronic device based on the plurality of parameters associated with the operation of the electronic device, identify a class of anomaly to which the anomaly of the electronic device belongs using a first on-device model, wherein the first on-device model is configured to determine possible classes of anomaly into which the identified anomaly of the electronic device can be classified and assign a probability score for the identified anomaly of the electronic device to each of the possible classes of anomaly, present at least one question associated with the identified class of anomaly to a user of the electronic device using a second on-device model, receive at least one user input for the at least one question, wherein the probability score assigned to each of the possible classes of anomaly is re-calibrated according to the at least user input, and perform at least one action for enhancing the user experience based on the at least one user input for the at least one question.

9. The electronic device of claim 8, wherein the class of anomaly into which the anomaly of the electronic device belongs is identified from a plurality of predefined classes of anomaly.

10. The electronic device of claim 8, wherein the first on-device model is an iterative re-trainable model.

11. The electronic device of claim 8, wherein second on-device model is a generative model.

12. The electronic device of claim 8, wherein the anomaly management engine is configured to perform at least one action for enhancing the user experience based on the at least one user input for the at least one question, comprises:

ascertain the anomaly of the electronic device based on the at least one user input for the at least one question.

13. The electronic device of claim 8, wherein the anomaly management engine is configured to perform at least one action for enhancing the user experience based on the at least one user input for the at least one question, comprises:

identify a remedial action for the anomaly of the electronic device based on the at least one user input for the at least one question.

14. The electronic device of claim 8, the anomaly management engine is further configured to:

save the at least one user input for the at least one question as indices;

upload the indices to a remote server;

receive updated indices from the remote server; and perform the retraining of the iterative re-trainable model.

15. The electronic device of claim 8, wherein the at least one question is presented as an actionable icon on a screen of the electronic device.

* * * * *